United States Patent [19]

Iwamoto

[11] Patent Number: 5,194,956
[45] Date of Patent: Mar. 16, 1993

[54] LENS AND APERTURE CONTROL APPARATUS

[75] Inventor: Koji Iwamoto, Tokyo, Japan

[73] Assignee: Sony Corporation, Tokyo, Japan

[21] Appl. No.: 599,025

[22] Filed: Oct. 17, 1990

[30] Foreign Application Priority Data

Oct. 24, 1989 [JP] Japan ................................. 1-276536
Oct. 30, 1989 [JP] Japan ................................. 1-282605

[51] Int. Cl.$^5$ ..................... H04N 5/232; H04N 5/238
[52] U.S. Cl. .................................. 358/209; 358/227; 358/228; 358/225
[58] Field of Search ........... 358/227, 228, 225, 213.19, 358/209; 354/446, 451, 452; 352/141

[56] References Cited

U.S. PATENT DOCUMENTS

| | | | |
|---|---|---|---|
| 4,638,350 | 1/1987 | Kato | 358/228 |
| 4,672,456 | 6/1987 | Murai | 358/227 |
| 4,717,959 | 1/1988 | Isago | 358/227 |
| 4,754,333 | 6/1988 | Nara | 358/213.19 |
| 4,903,135 | 2/1990 | Ohtake | 358/227 |
| 4,935,763 | 6/1990 | Itoh | 358/227 |
| 4,967,281 | 10/1990 | Takada | 358/225 |
| 4,969,044 | 11/1990 | Hijikata | 358/227 |
| 4,985,777 | 1/1991 | Kawada | 358/227 |
| 4,998,162 | 3/1991 | Kondo | 358/228 |

FOREIGN PATENT DOCUMENTS

0232783 11/1985 Japan .
0255837 10/1989 Japan .

*Primary Examiner*—James J. Groody
*Assistant Examiner*—Sherrie Hsia
*Attorney, Agent, or Firm*—Alvin Sinderbrand; William S. Frommer

[57] ABSTRACT

Lens control apparatus for use in a video camera in which an object is imaged through an adjustable lens onto an image pick-up element from which a video signal is derived. The lens is driven for focus or zoom adjustments by servo control at a rate determined by the synchronizing signal included in the video signal. The aperture of the video camera also is controlled by detecting the amount of light which impinges on the image pickup element and then determining the ratio between the detected light level and a reference level representing the brightness of the object. The aperture is driven (i.e. it is enlarged or reduced) as a function of the product of the aforementioned ration and a coefficient which changes with the aperture opening. When the aforementioned ratio is less than unity, the coefficient increases as the aperture opening decreases and, conversely, decreases as the opening increases. When the ratio is greater than unity, the coefficient increases as the aperture opening increases and, conversely, decreases as the opening decreases.

16 Claims, 2 Drawing Sheets

| F Number | Smaller G for V/Vr Than 1 | Larger G for V/Vr Than 1 |
|---|---|---|
| F1.4 | 0.4 | 1.0 |
| F2 | 0.6 | 1.0 |
| ⋮ | ⋮ | ⋮ |
| F11 | 1.0 | 0.2 |
| F16 | 1.0 | 0.1 |

LENS AND APERTURE CONTROL APPARATUS

BACKGROUND OF THE INVENTION

1. Field of the Invention

This inventions relates to automatic control over video cameras and, more particularly, to apparatus for controlling the lens and aperture of a video camera.

2. Description of the Prior Art

Video cameras are known with motor-driven lenses which effect automatic focus control as well as operator initiated zoom lens control. Such cameras also are provided with automatic aperture control arrangements. To provide greater flexibility and permit the use thereof under diverse conditions, such video cameras are operable with removable lenses. Consequently, different lenses having different focal lengths and different ranges of aperture openings (commonly referred to as f-stops) may be used with a given video camera. Depending upon the distance of the imaged object from that camera and the lighting conditions thereof, the user is provided with a wide selection of lenses for use.

Zoom lenses having selectively variable focal lengths also are available for use with video cameras to permit artistic effects by "zooming" in or out, and also to permit the use of one lens to image an object whose distance from the camera may change.

Video camera that are designed for fixed lenses as well as those that are designed for removable lenses advantageously are adapted to control the focusing and/or "zooming" effect by means of one or more drive motors. To facilitate the use of several different removable lenses, it has been proposed to incorporate the lens drive motor and the lens elements in a common housing which, together with control circuitry is referred to generally as a lens device. One example of a lens device having both a focusing motor and a zoom motor is described in Japanese published patent application No. 63-042274. The video camera with which this lens device is used includes circuitry to produce a focus control signal and a zoom control signal which are coupled to the focus and zoom motors in the lens device by an electrical connection which is formed when the lens device is mounted on the camera. The focus motor thus adjusts the focus condition of the lens device and the zoom motor controls the focal length thereof and, thus, the imaging angle of view.

In a typical arrangement of the aforementioned combination of a video camera and replaceable lens device, the control signals supplied from the camera housing to the lens device generally are simple "stop/go" signals. For example, the focus control signal may exhibit a constant magnitude which is used to drive the focus motor and a polarity which determines the direction in which that motor is driven. Likewise, the zoom control signal may exhibit a substantially constant magnitude to drive the zoom motor and a polarity which determines whether the motor is driven to "zoom in" or "zoom out".

Since the lens control signal (i.e. the focus control signal or the zoom control signal) is of a constant magnitude, such arrangements assume that the lens drive motors will be driven at a substantially constant speed, whereby uniform focus and zoom adjustments are effected. Uniform lens adjustment speeds for different replaceable lenses and for different operating conditions are desired. The user may be accustomed to a particular focus adjustment speed or zoom adjustment speed; and, therefore, unanticipated speed variations are not welcome. However, the assurance of uniform adjustment speeds generally requires the use of a reference and feedback control to make certain that the adjustment speed conforms to the reference.

In an attempt to miniaturize the motor control circuits incorporated into replaceable lens devices, reference generators normally included in the lens device for motor speed control have been omitted. Even without a reference generator, it had been assumed that by using control signals of constant magnitude, uniform speeds nevertheless may be attained and feedback control was not needed. But, because of changes in ambient temperature, changes in the load presented to the lens drive motors and variations in the operating characteristics from one replaceable lens device to another, the magnitude of the lens control signal may not be constant but, rather may vary. Furthermore, even if the magnitude of the lens control signal remains constant such that the signal is sufficient to control the focusing and zooming of one lens device at a proper rate of speed, the control signal may be inadequate for accurate control at desired speed of another lens device.

Consequently, focus and zoom adjustment speeds may vary from one lens device to another and, as the environmental conditions vary, the focus and zoom adjustment speeds for a given lens device may fluctuate. Hence, stable adjustment speeds of such lens devices may not be achieved.

A similar disadvantage is present in the aperture control arrangement for such replaceable lenses. That is, the aperture opening of the iris normally provided in the lens device may be increased or decreased at a rate of speed that is not stably controlled.

Moreover, for aperture control, it often is desired to reduce the adjustment speed of the aperture when the opening thereof approaches a desired value, or f-stop. That is, overshoot, which may occur if the aperture is adjusted at a constant speed, is prevented, or at least minimized, if the adjustment speed is reduced as the aperture approaches a desired opening. For example, if the aperture opening is too small for the brightness level of an imaged object, it is desirable to increase the aperture opening at a relatively faster rate initially and then reduce the rate at which the aperture is opened when the proper f-stop is approached, thereby preventing or minimizing any overshoot in such aperture adjustment.

OBJECTS AND SUMMARY OF THE INVENTION

Therefore, is an object of the present invention to provide improved lens control apparatus for use in a video camera which overcomes the aforementioned disadvantages but, nevertheless facilitates miniaturization of the lens device.

Another object of this invention is to provide improved aperture control apparatus for use in a video camera wherein rapid and accurate adjustments in the aperture opening are attained.

A further object of this invention is to provide stable and uniform adjustment speeds in a replaceable lens device used with a video camera without requiring a reference generator in that lens device.

An additional object of this invention is to provide stable and uniform speeds in the adjustment of the focus and/or zoom condition of a lens device used with a video camera.

Still another object of this invention is to provide improved lens and aperture control apparatus for use in a miniaturized replaceable lens.

A still further object of this invention is to provide improved aperture adjustment apparatus which prevents overshoot and hunting in the aperture opening of a video camera lens device Another object of this invention is to control the aperture adjustment of a replaceable lens device used in a video camera such that a desired aperture opening may be obtained at high speed.

Various other objects, advantages and features of the present invention will become readily apparent from the ensuing detailed description, and the novel features will be particularly pointed out in the appended claims.

In accordance with this invention, lens control apparatus is provided for a video camera in which an object is imaged through an adjustable lens onto an image pick-up device from which a video signal is derived. Servo control is used to drive the lens at a rate determined by the synchronizing signal included in the video signal preferably, the adjustable lens is a removable lens device.

As one aspect of this invention, the synchronizing signal which determined the rate at which the lens is driven is produced by a synchronizing signal generator included in the video camera and, preferably, this is the vertical synchronizing signal normally included in the video signal.

In accordance with another aspect of this invention, a focus motor and a zoom motor are used to adjust the focus and zoom conditions of the lens, these motors producing pulses at a frequency determined by their respective operations. The motors are controlled such that the pulse frequencies exhibit a substantially constant relationship with respect to the vertical synchronizing frequency.

As another aspect of this invention, focus adjustments are carried out automatically in response to a focus condition sensed from the video signal derived from the image pickup element.

As another feature of this invention, aperture control apparatus is provided for use in a video camera in which an object is imaged onto an image pickup element through an aperture having an adjustable opening. The light level impinging on the image pick-up element is detected and a ratio between the detected light level and a reference light level representing brightness of the imaged object is determined. An aperture drive signal that is a function of the product of the ratio and a variable coefficient is generated, the coefficient varying in one direction with the aperture opening when the ratio is greater than unity and varying in an opposite direction with the aperture opening when the ratio is less than unity. The aperture is driven in response to this aperture drive signal.

As one aspect of this feature, the coefficient changes inversely with the aperture opening when the ratio is less than unity and changes directly with the aperture opening when the ratio is greater than unity. Preferably, the minimum value of the coefficient when the ratio is greater than unity is less than the minimum value of the coefficient when the ratio is less than unity In one embodiment, a processor stores look-up tables of coefficient values, with one table storing coefficient values that correspond to respective aperture openings when the ratio is less than unity and another table storing coefficient values that correspond to respective aperture openings when the ratio is greater than unity.

As another aspect of this invention, updated ratio data is supplied periodically to an aperture drive signal generator from which the aperture drive signal is produced. Advantageously, the rate at which this updated ratio data is supplied is determined by the vertical synchronizing frequency of the video signal produced by the video camera; and, in a preferred embodiment, this rate is equal to a frame rate (i.e. one half the vertical synchronizing frequency).

BRIEF DESCRIPTION OF THE DRAWINGS

The following detailed description, by way of example and not intended to limit the present invention solely thereto, will best be understood in conjunction with the accompanying drawings in which.

DETAILED DESCRIPTION OF PREFERRED EMBODIMENTS

Figure 1:
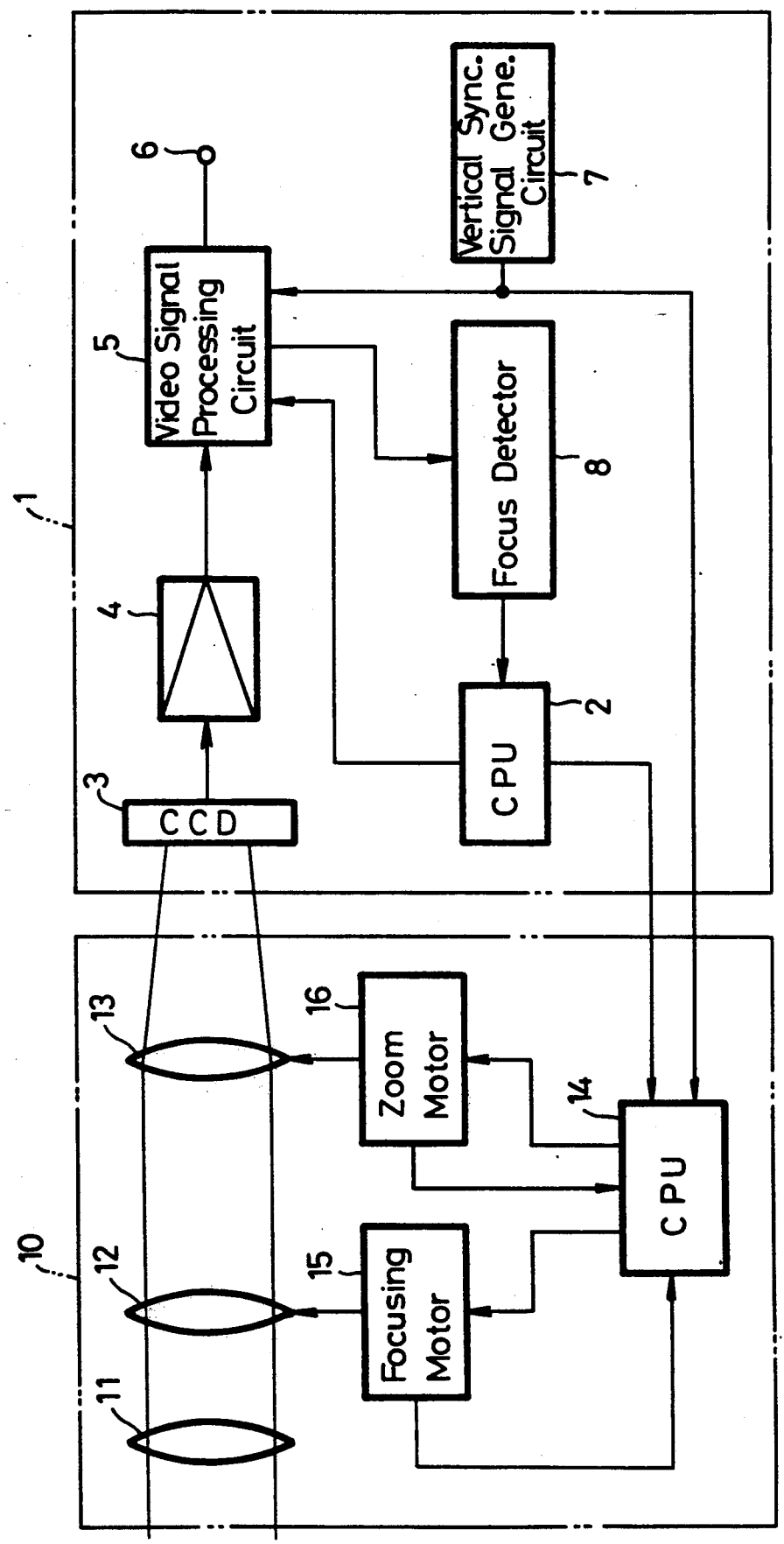
FIG. 1 is a block diagram illustrating one feature of the present invention.

Referring to FIG. 1, there is illustrated an embodiment of lens control apparatus for use in a video camera of the type having a camera housing 1 to which a removable lens device 10 is mountable. For convenience, housing 1 and the elements therein are referred to collectively as a video camera. As illustrated, the video camera includes an image pick-up device 3, a video signal processor 5, a focus detector 8 and a data processor (such as a central processing unit CPU)2.

Image pickup device 3 preferably includes a solid state image pickup element and may be a conventional charge coupled device (CCD). The image pickup device is adapted to produce a video signal in response to an image projected thereto through lens device 10. Image pickup device 3 is coupled to video signal processor 5 by a video amplifier 4.

The video signal processor is conventional and is adapted to produce a video signal comprised of video information derived from the image projected to image pickup device 3, together with conventional horizontal synchronizing signals and conventional vertical synchronizing signals The latter are supplied to the video signal processor by a vertical synchronizing signal generator 7 which may be of conventional construction. Vertical synchronizing signal generators are well known to those of ordinary skill in the television art and, in the interest of brevity, further description thereof is not provided. As will be described below, the vertical synchronizing signal produced by generator 7 additionally is supplied to lens device 10.

The video signal produced by video signal processor 5 is coupled to an output terminal 6 from which a television signal may be recorded by a conventional video signal recorder or, alternatively, the television signal may be coupled to a suitable display.

It will be appreciated that an image sharply focused on image pickup device 3 is provided with a relatively sharp boundary between the focused object and its background. In the event of an unfocused condition, the sharpness of the boundary is reduced. This boundary is represented by a high frequency component in the image pickup signal. The magnitude of the high frequency component thus is reduced when lens device 10 is not in a proper, focused condition.

Focus detector 8 is coupled to video signal processor 5 and is adapted to detect the magnitude of the high frequency component included in the video signal derived from image pickup device 3. The focus detector thus produces a signal representing the focus condition of the lens device. This focus condition signal is digitized and supplied to processor 2 (hereinafter referred to as a CPU). CPU 2 may comprise a microprocessor of conventional type (such as those manufactured by Intel, Motorola, Hitachi, and other microprocessor suppliers) and is also coupled to video signal processor 5 to control the operation thereof. The operative inter-relationship between the CPU and the video signal processor forms no part of the present invention per se and further description thereof is not provided.

Although not shown herein, it will be appreciated that signals produced by manually operable switches may be supplied to CPU 2 for the purpose of effecting various controls, including a zoom control as will be described. At this point, suffice it to say that a zoom control signal may be selected by an operator whose operation of manual switches or other suitable controls commands a "zoom-in" or "zoom-out" operation.

The focus and zoom operations are carried out by the elements included in lens device 10. The lens device preferably is comprised of plural lens elements schematically illustrated as lens elements 11, 12 and 13. For convenience, lens element 11 may be thought of as being fixed and lens element 12 is adjustable relative to lens element 11 so as to vary the focus condition of lens device 10. A focusing motor 15 is mechanically coupled to lens element 12 to adjust the position of that lens element and, thus, to adjust the focus condition of lens device 10, in response to a lens drive signal produced by a processor 14. The processor, referred to as a CPU, preferably is comprised of a microprocessor and may be similar to CPU 2.

In the preferred embodiment, CPU 14 is located physically within the housing of lens device 10 and is adapted to receive a signal produced by focusing motor 15 indicative of the operation of that motor. Advantageously, pulses are produced by a suitable frequency generator (not shown) included in or mechanically coupled to focusing motor 15 at a repetition rate directly related to the operating (or drive) speed of the focusing motor. Hence, as the motor speed increases, the pulse frequency increases and, conversely, as the motor speed decreases the pulse frequency likewise decreases. Thus, CPU 14 is provided with an indication of the operating speed of the focusing motor 15.

Lens element 13 is identified for the purpose of the present description, as a zoom lens element. This lens element is adjustable thus to vary the focal length of lens device 10 from wide angle to telephoto. Lens element 13 is driven by a zoom motor 16 which may be similar to focusing motor 15. A zoom lens drive signal is supplied to the zoom motor by CPU 14 to control the direction and rate of speed of the motor. Like focusing motor 15, zoom motor 16 supplies pulses to CPU 14 exhibiting a repetition rate determined by the operating speed of the zoom motor. Hence, as the speed of zoom motor 16 increases, the frequency of the pulses supplied thereby to CPU 14 also increases. Conversely, as the operating speed of the zoom motor decreases, the pulse frequency likewise decreases As shown, CPU 14 is coupled to CPU 2 and to a vertical synchronizing signal generator 7 included in video camera 1 by way of a suitable electrical connection between the video camera and lens device 10. Conventional connectors, such as plug and socket, pins, etc. may be used for this connection. CPU 14 thus is adapted to receive the vertical synchronizing signal produced by generator 7 as well as a lens control signal produced by CPU 2, the latter including a focus command produced by CPU 2 in response to the focus indicating signal supplied by focus detector 8. The lens control signal coupled to CPU 14 also may include a zoom control signal produced in response to operator actuation of a suitable zoom selector switch (not shown).

In operation, an object is imaged to image pickup device 3 by lens elements 11, 12 and 13 of lens device 10. The image pickup device supplies an image signal to video signal processor 5 whereat the image signal is processed and combined with synchronizing signals, including the vertical synchronizing signal produced by generator 7, to supply a video signal to an output terminal 6. This video signal also is supplied to focus detector 8 which, as mentioned above, detects the focus condition of the object being imaged through lens device 10.

Focus detector 8 provides a focus indicating signal to CPU 2 which, in turn, supplies a focus command to CPU 14 included in lens device 10. CPU 2 thus supplies CPU 14 with data which is used by CPU 14 to determine the direction in which focusable lens element 12 must be adjusted to focus lens device 10 properly on the object being imaged. As earlier described, lens control data supply by CPU 2 need not indicate the magnitude with which lens element 12 should be driven CPU 14 also receives vertical synchronizing signals from a vertical synchronizing signal generator 7 and exercises servo control over focusing motor 15 in response to this vertical synchronizing signal and the lens control data supplied thereto. More particularly, focusing motor 15 is driven by CPU 14 in a direction determined by the lens control signal supplied by CPU 2 so as to drive lens element 12 in a direction to establish a proper, focused condition for lens device 10.

As focusing motor 15 operates, pulses having a frequency determined by the operating speed of the focusing motor are supplied to CPU 14. This pulse frequency is compared to the vertical synchronizing frequency of vertical synchronizing signal generator 7. In one embodiment, when focusing motor 15 operates at a proper, desired speed, a predetermined relationship is established between the repetition rate of the pulses produced by the focusing motor and the vertical synchronizing frequency. CPU 14 adjusts the operating speed of the focusing motor so as to maintain this relationship constant. Hence, regardless of the direction in which lens element 12 is moved for focus adjustments, focusing motor 15 drives the lens element at a substantially constant speed.

Zoom motor 16 is controlled by CPU 14 in substantially the same way as is focusing motor 15. CPU 2 supplies zoom lens control data to CPU 14 in response to the actuation of a suitable zoom switch (not shown) by an operator. Depending upon the selected direction in which lens element 13 is to be driven, that is, depending upon whether a wide angle or telephoto image is desired, CPU 2 supplies CPU 14 with zoom control data determinative of this direction. CPU 14 then supplies zoom motor 16 with a suitable motor drive signal so as to drive the zoom motor at a substantially constant, desired speed. The actual operating speed of the zoom motor is represented by the repetition rate of the pulses supplied therefrom to CPU 14. When the zoom motor operates at its proper speed, a predetermined relationship is established between the repetition rate of these pulses and the vertical synchronizing frequency. CPU 14 exercises servo control over zoom motor 16 such that the zoom motor operates at a speed whereby this relationship is maintained constant.

When performing a focus control operation, CPU 2 commands CPU 14 to continue the focus adjustment until CPU 2 is supplied with a focus indicating signal from focus detector 8 indicating that lens device 10 is properly focused. At that time, CPU 2 commands CPU 14 to terminate the focus adjustment operation, whereupon focusing motor 15 is de-energized and the established focused condition is maintained.

Likewise, when an operator releases the zoom selector switch, CPU 2 commands CPU 14 to terminate the zoom operation. Consequently, CPU 14 de-energizes zoom motor 16 and lens element 13 is maintained at the selected zoom position.

From the foregoing description, it will be appreciated that focusing motor 15 and zoom motor 16 are controlled by CPU 14 to operate at respective, constant speeds. Speed control is effected by comparing the operating speeds of these motors with the vertical synchronizing frequency included in the video signal produced by video signal processor 5. Hence, if lens device 10 is replaced by another removable lens structure having motor-driven focus and zoom adjustments, the operation of the focusing and zoom motors included in the replacement lens structure likewise is controlled by the vertical synchronizing frequency of the video signal. The CPU included in the replacement lens structure cooperates with the focusing and zoom motors to form focusing and zoom servo control circuits, whereby focus and zoom adjustments are made at constant speeds.

Even though lens device 10 does not include a reference voltage generator (and, thus facilitates miniaturization of the lens device), focus and zoom adjustments are effected at constant, uniform, stable speeds. Changes in environmental conditions will not affect such speeds, provided that the vertical synchronizing frequency remains substantially constant. This latter condition is readily achieved by conventional vertical synchronizing generators known to those of ordinary skill in the art.

Likewise, changes in the load driven by focusing motor 15 and zoom motor 16 will not result in an unanticipated or unstable change in the operating speeds of these motors because of the servo control operation effected thereover by CPU 14.

Figures 2, 3:
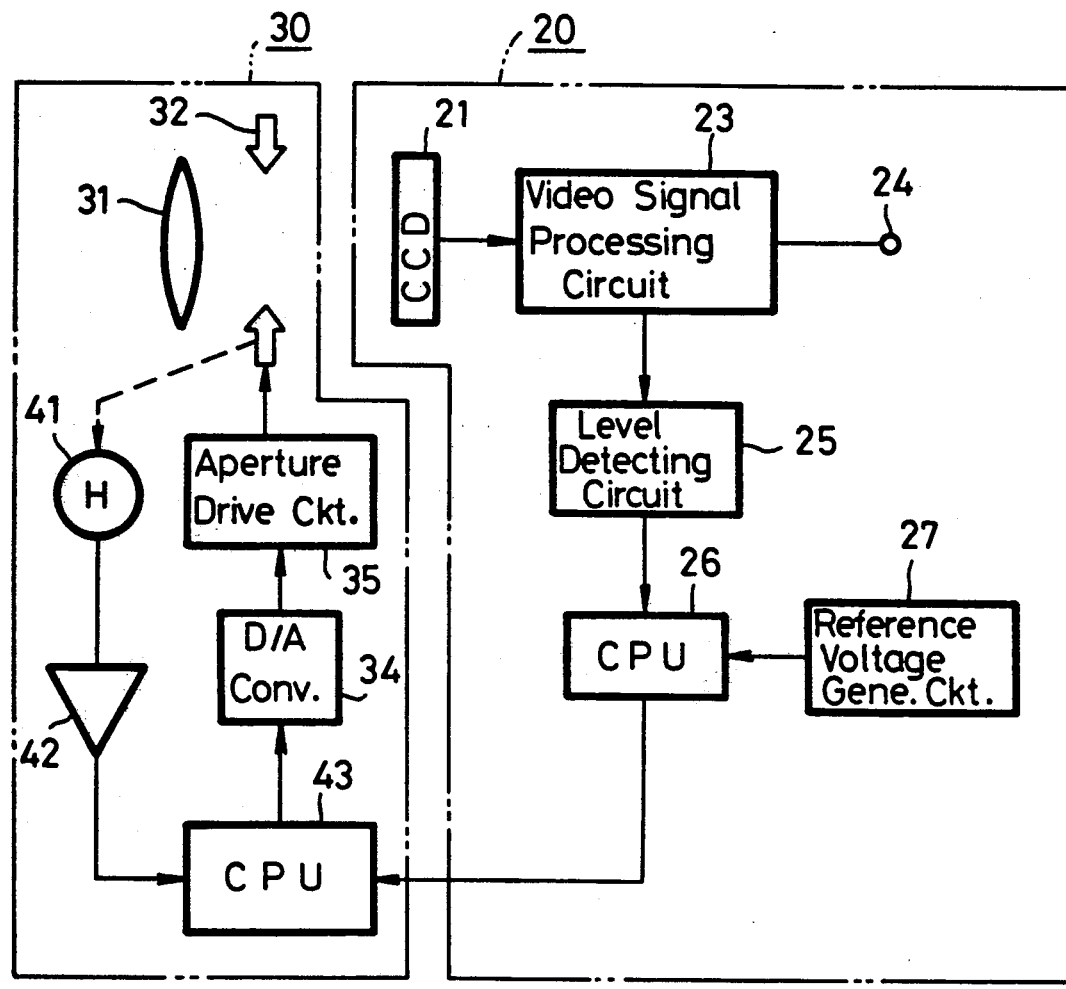
FIG. 2 is a block diagram illustrating another feature of the present invention.
FIG. 3 is a coefficient table which is useful in understanding a desirable aspect of the operation of the apparatus illustrated in FIG. 2.

Element 8 has been described herein as a focus detector to simplify the description of the illustrated apparatus when used to provide automatic focus adjustment of lens device 10. Element 8 also may include a light level detector for detecting the light level of the object imaged to image pickup device 3. A light level detector generally is used to control adjustments to the aperture opening through which the light image is projected. This aperture opening may be provided on lens device 10 or, alternatively, may be provided at the image input of video camera 1. An example of a modification of the lens control apparatus illustrated in FIG. 1 to achieve aperture control is shown in FIG. 2 and now will be described. Here, a video camera 20 is mechanically and electrically connectable to a removable lens device 30.

As in the FIG. 1 embodiment, video camera 20 includes an image pickup device 21, a video signal processor 23, a processor or CPU 26 and a reference voltage generator 27. Elements 21, 23 and 26 may be similar to the aforedescribed elements 3, 5 and 2, respectively.

Reference voltage generator 27 is coupled to CPU 26 and is adapted to supply thereto a reference voltage $V_r$ which represents the brightness of an object being imaged by the video camera. The reference voltage generator thus may be similar to a conventional light meter; and the reference voltage $V_r$ produced thereby corresponds to a reference light level sensed by that light meter. It will be appreciated that commercial video cameras are available with built-in light meters and, therefore, one of ordinary skill in the art would be enabled to provide reference voltage generator 27.

Video signal processor 23 is adapted to supply a video signal to an output terminal 24 and, in addition, to supply a luminance signal Y to a light level detector 25 coupled thereto. The light level detector is adapted to detect the brightness level of luminance signal Y. A voltage V representing the brightness level of the luminance signal is supplied from level detector 25 to CPU 26. It will be appreciated that the voltage V thus represents the actual light level of the light image projected through lens device 30 and impinging upon image pickup device 21. This light level is function of the opening of the aperture through which the object is imaged to the image pickup device.

CPU 26 is adapted to determine the ratio between the actual light level of the image impinging upon image pickup device 21 and the actual brightness of that image. The CPU thus functions to determine the ratio $V/V_r$. It will be recognized that when this ratio $V/V_r$ is equal to unity ($V/V_r=1$), the light level of the image incident on the image pick-up device is equal to the reference light level produced by reference voltage generator 27. This ratio varies as a function of the aperture opening. Hence, when $V/V_r=1$, the aperture opening is correct and corresponds to the reference light level produced by reference voltage generator 27. CPU 26 generates aperture control date $I=V/V_r$, which is supplied to lens device 30.

Lens device 30 includes a lens element 31 and, in the illustrated embodiment, an adjustable aperture, or iris 32. In some photographic equipment an adjustable aperture is provided in the camera body and in other equipment the adjustable aperture is in the lens. It is preferred herein to include adjustable aperture 32 in lens device 30. The adjustable aperture, or iris, is driven by an iris drive circuit 35 which, for example, may include a suitable motor. An iris drive signal is supplied to iris drive circuit 35 by a processor, or CPU 43, which is coupled to CPU 26 and receives the aperture control data I therefrom This aperture control data is in digital form and, as shown, CPU 43 is adapted to produce an aperture drive signal which also is in digital form. This aperture drive signal is converted to analog form by a digital-to-analog (D/A converter) 34 and supplied to iris drive circuit 35.

Iris 32 or, alternatively, the iris motor included in iris drive circuit 35, is mechanically coupled to a Hall element 41 which is adapted to detect the actual position or aperture opening of iris 32. Stated otherwise, Hall element 41 functions to detect the f-stop of the iris. A signal corresponding to the detected aperture opening is supplied from the Hall element to CPU 43 by an amplifier 42.

Although lens device 30 is illustrated as including a single lens element 31, it will be appreciated that this lens element may comprise a lens system of the type shown in FIG. 1 and may be comprised of a plurality of elements, such as lens elements 11, 12 and 13. Hence, the lens elements included in lens device 30 may be adjustable to control the focus condition thereof as well as to control the focal length to achieve a "zoom" operation.

It will also be appreciated that CPU 43 may be similar to CPU 14, described in conjunction with FIG. 1. In addition, CPU 43 may include a storage device, such as a read only memory (ROM) for storing coefficient data corresponding to the respective f-stops which may be assumed by iris 32. In the example described herein, it is assumed that the iris is adjustable over a range of discrete f-stops; and particular examples of such f-stops are described below.

The stored coefficient data may be in the form of one or more look-up tables, with each table storing a predetermined coefficient associated with a particular f-stop. The purpose of these coefficients and an illustrative example of preferred coefficients now will be described in conjunction with FIG. 3.

Desirably, when an aperture adjustment is to be effected, the aperture opening of iris 32 initially should be changed at a relatively rapid rate and the speed of adjustment should decrease as the aperture opening approaches its proper value (it will be appreciated that the correct aperture opening is indicated when the ratio $V/V_r=1$, that is, when $V=V_r$). This reduction in the speed at which the aperture is opened or closed as the aperture opening reaches its proper value prevents overshoot and hunting. Accordingly, to achieve this reduction in speed, the present invention proceeds by multiplying the aperture control data $V/V_r$ by a coefficient read from the look-up table, with this coefficient having a value which decreases as the aperture opening of iris 32 approaches its proper value.

Referring to FIG. 3, it is seen that the relationship between the aperture opening, or f-stop, and the coefficient when the aperture control data $V/V_r$ is less than unity differs from the relationship therebetween when the aperture control data $V/V_r$ is greater than unity. When $V/V_r<1$, this coefficient G increases from a minimum value of, for example, 0.4 when iris 32 exhibits its maximum aperture opening (represented as the f-stop f-1.4) and increases gradually as the aperture opening decreases. In FIG. 3, the coefficient is equal to its maximum value 1.0 when the aperture opening is equal to f-11 or greater.

Conversely, when the aperture control data $V/V_r$ is greater than unity, the value of the coefficient increases as the aperture opening increases. From FIG. 3, it is seen that the coefficient G exhibits a minimum value of 0.1 for a minimum aperture opening f-16, and this coefficient increases as the aperture opening increases until a maximum value 1.0 is reached when the aperture opening is equal to, for example, f-2.

Thus, the coefficient varies in one direction with the aperture opening when the ratio $V/V_r$ is greater than unity and varies in an opposite direction with the aperture opening when this ratio is less than unity.

In one embodiment, the position of the aperture opening, that is, the iris position sensed by hall element 41 is used to access the look-up table stored by CPU 43. The particular coefficient associated with a particular aperture opening is selected as a function of whether $V/V_r<1$ or $V/V_r<1$.

From FIG. 3, it is seen that the minimum coefficient that may be selected when $V/V_r<1$ is greater than the minimum coefficient that may be selected when $V/V_r \geq 1$ in order to correct the loop gain included in the aperture control servo loop. It has been found that, when the aperture opening is small but, nevertheless, should be made smaller because $V/V_r<1$, the loop gain of the servo control circuitry is higher than when the aperture opening is large but should be made even larger, as when $V/V_r<1$.

If the coefficient selected from the look-up table used with CPU 43 is represented as G, then CPU 43 produces aperture drive data D which may be expressed as:

$$D = K \times (V/V_r) \times G$$

wherein K is a proportionality constant, G is the selected coefficient which varies in accordance with the tables shown in FIG. 3, and $V/V_r$ is, of course, the aforementioned ratio.

Drive data D is converted to analog form by D/A converter 34 and supplied to the drive motor included in aperture drive circuit 35, whereby aperture 32 is adjusted in a direction which tends to make $V/V_r=1$. That is, the aperture is driven toward a desired, or target opening (or f-stop), depending upon the value of the ratio $V/V_r$.

When $V/V_r<1$, the actual light level impinging upon image pickup device 21 is less than the brightness of the object, as represented by the reference voltage $V_r$. Hence, for this condition, the aperture is driven in a direction to increase its opening; and as each discrete f-stop is sensed by Hall element 41, the coefficient G read from the look-up table and used to generate the aperture drive data is decreased, as represented by the table of FIG. 3.

Conversely, when $V/V_r<1$, the actual light level impinging upon the image pickup device is greater than the brightness of the object. In this condition, aperture 32 is driven in a direction to reduce its opening; and the coefficient G read from the look-up table and used to generate the aperture drive data decreases when successive, discrete f-stops are reached, as is observed from the table shown in FIG. 3. It is, of course, appreciated, that as the aperture opening changes, the ratio data $V/V_r$ supplied from CPU 26 to CPU 43 likewise changes.

Advantageously, this updated ratio data is supplied to CPU 43 periodically. In the preferred embodiment, such updated ratio data is supplied at a rate determined by the vertical synchronizing frequency of the video signal produced by video signal processor 23. For example, the updated ratio data is supplied at the frame rate of the video signal (i.e. at a rate substantially equal to one-half the vertical synchronizing frequency).

In operation, let it be assumed that the actual aperture opening of aperture 32 is equal to f-11, as detected by Hall element 41. Let it be further assumed that, at this aperture opening, the light level impinging upon image pick-up device 21 is substantially less than the brightness of the object such that CPU 26 produces ratio data $V/V_r<1$. CpU 43 is supplied with this ratio data as well as with the detected aperture opening to retrieve from the look-up tables the coefficient $G=1.0$. Accordingly, CPU 43 produces aperture drive data which, when converted to analog form, opens the aperture. As the aperture opening increases, Hall element 41 detects a changing f-stop which is used by CPU 43 to read reduced value coefficients G from the look-up table. Hence, as the aperture opening increases, the gain of the aperture drive signal D decreases. Consequently, the speed at which the aperture opening increases is reduced from its initial maximum speed as the aperture opening approaches its target value.

It is, of course, appreciated that, as the aperture opening increases, the light level impinging upon image pickup device 21 increases, such that the ratio $V/V_r$ approaches unity. As aforementioned, CPU 26 supplies to CPU 43 updated ratio data periodically. Hence, CPU 43 likewise generates periodically updated aperture drive data D to drive aperture 32 toward its target f-stop at a gradually reduced speed. While this provides accurate high speed aperture control, the reduction in the speed at which the aperture opening increases avoids, or at least substantially minimizes, any overshoot in or hunting of the final opening. The gain of the aperture drive signal D thus is varied so as to exhibit an optimum level even as the aperture undergoes adjustment.

Let it now be assumed that the opening of aperture 32, as sensed by Hall element 41, corresponds to an f-stop of f-3.5; and that the actual light level impinging upon image pickup device 21 is greater than the object brightness, such that CPU 26 produces ratio data $V/V_r < 1$. Although not shown in FIG. 3, consistent with this example, CPU 43 selects a coefficient of G, for instance, 0.8. Hence, aperture drive data D is produced which tends to close the aperture opening and this, in turn, tends to cause the ratio $V/V_r$ to approach unity. As the aperture opening decreases, Hall element 41 senses discrete f-stops, and CPU 43 reads corresponding coefficients of reduced value from the look-up table. Accordingly, the gain of the aperture drive signal supplied to aperture drive circuit 35 decreases as the aperture opening approaches its target value.

From the foregoing, it is seen that, when aperture 32 is to be adjusted, the speed at which this adjustment is made initially is relatively high, and decreases as the aperture opening approaches its desired F-stop. By reducing the magnitude of the coefficient G, the aperture opening reaches its target value smoothly and overshoot and hunting therein are substantially avoided.

In the preferred embodiment, lens device 30 is removably mounted to the housing of video camera 20. As shown in FIG. 2, the lens device includes the servo control circuitry by which the opening of aperture 32 is adjusted. It has been assumed in the foregoing discussion that the adjustable aperture is located within the lens device itself. Hence, proper aperture control is attained even when different replacement lens devices are used with video camera 20.

While the present invention has been particularly shown and described with reference to preferred features and embodiments, it will be appreciated by those of ordinary skill in the art that various changes and modifications may be made without departing from the spirit and scope of the invention; and some of these alternatives have been discussed above. It is intended, therefore, that the appended claims be interpreted as covering the embodiments specifically disclosed herein, the alternatives which have been proposed or suggested above, as well as all equivalents thereto.

What is claimed is:

1. A video camera comprising:
   a camera housing containing image pickup means for providing a video signal corresponding to an image projected onto said image pickup means, and means for generating a vertical synchronizing signal to be included in said video signal;
   exchangeable lens devices interchangeably mountable on said camera housing and each including respective adjustable lens means through which said image is projected onto said image pickup means, motor means operable for adjusting said respective lens means, said lens means presenting a load to said motor means that is different from the load presented by said lens means of at least one other of said exchangeable lens devices, means for generating pulses at a frequency corresponding to a rate of adjustment of said respective lens means, and processor means responsive to said vertical synchronizing signal and said pulses for providing a lens drive signal controlling said motor means so that said rate of adjustment of said respective lens means is substantially uniformly determined as a function of said vertical synchronizing signal irrespective of said load presented by said respective lens means.

2. The video camera according to claim 1; wherein said adjustable lens means includes zoom lens elements driven by said motor means.

3. The video camera according to claim 1; wherein said adjustable lens means includes a focusable lens element driven by said motor means.

4. The video camera according to claim 3; wherein said camera housing further contains focus detect means coupled to said image pickup means for detecting a focus condition of the one of said lens devices mounted on said camera housing and for supplying to said processor means a focus indicating signal representing said focus condition; and wherein said processor means is further responsive to said focus indicating signal to generate said lens drive signal.

5. The video camera according to claim 1; wherein said image pickup means comprises a charge coupled device.

6. Aperture control apparatus for use in a video camera in which an object is imaged through aperture means having an adjustable opening onto image pickup means from which a video signal is derived, said apparatus comprising: aperture detecting means for detecting the opening of said aperture; light detecting means for detecting a level of light impinging on said image pickup means; ratio determining means responsive to said light detecting means for determining a ratio between the detected light level and a reference light level representing brightness of said object; aperture drive signal generating means for generating an aperture drive signal that is a function of the product of said ratio and a coefficient which varies in one direction with said detected aperture opening when said ratio is greater than unity and which varies in an opposite direction when said ratio is less than unity; and drive means responsive to said aperture drive signal for controlling the opening of said aperture means.

7. The apparatus of claim 6 wherein said coefficient changes inversely with said detected aperture opening when said ratio is less than unity, and said coefficient changes directly with said detected aperture opening when said ratio is greater than unity.

8. The apparatus of claim 7 wherein the minimum value of said coefficient when said ratio is greater than unity is less than the minimum value of said coefficient when said ratio is less than unity.

9. The apparatus of claim 6 wherein said aperture drive signal generating means includes processor means for storing a table of coefficient values corresponding to detected aperture openings for ratios less than and greater than unity, respectively.

10. The apparatus of claim 9 wherein said processor means includes means for retrieving a coefficient value from said table in response to a detected aperture opening and the ratio determined by said ratio determining means, and means for multiplying said determined ratio and the retrieved coefficient value to produce said aperture drive signal.

11. The apparatus of claim 10 wherein said ratio determining means supplies a determined ratio to said processor means periodically.

12. The apparatus of claim 11 wherein the video signal derived from said image pickup means includes a vertical synchronizing signal having a vertical synchronizing frequency, and wherein said determined ratio is supplied to said processor means at a rate determined by said vertical synchronizing frequency.

13. The apparatus of claim 12 wherein said determined ratio is supplied to said processor means at one-half the vertical synchronizing frequency.

14. The apparatus of claim 6 wherein said aperture detecting means comprises a Hall element coupled to said aperture means to produce a positional signal representing the aperture opening position of said aperture means.

15. The apparatus of claim 6 wherein said image pickup means comprises a charge coupled device.

16. The apparatus of claim 6 wherein said video camera includes a camera housing for receiving a removable lens means; and wherein said aperture drive signal generating means is included in said removable lens means.

* * * * *